Sept. 2, 1969  H. E. McCABE  3,464,285
REMOTE CONTROL ASSEMBLY
Filed Oct. 10, 1966
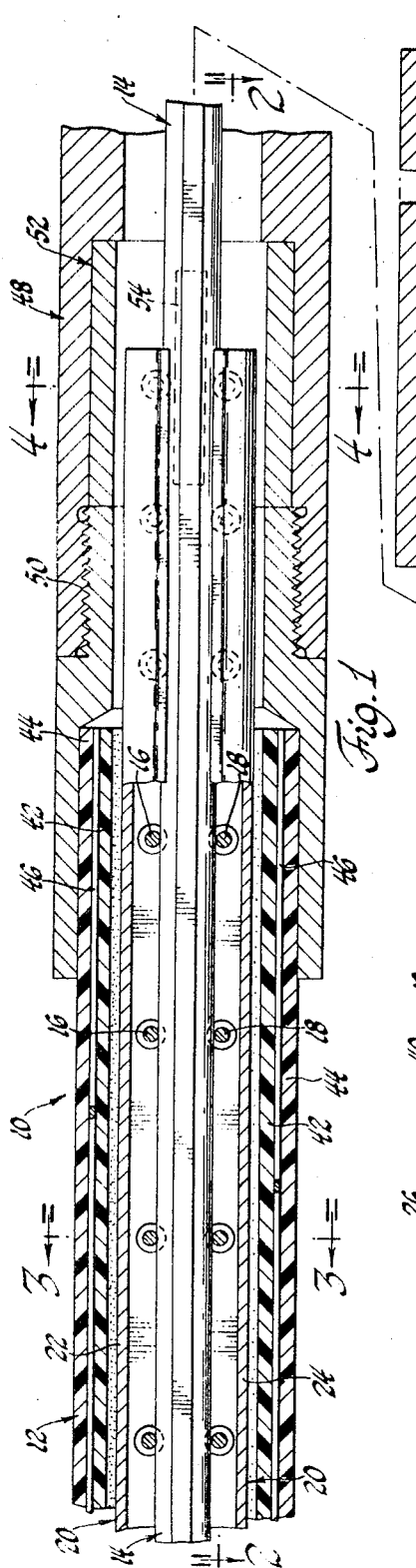
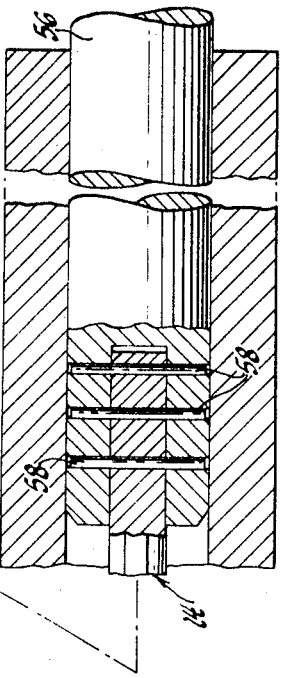
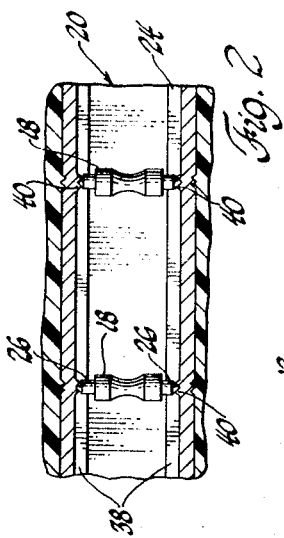
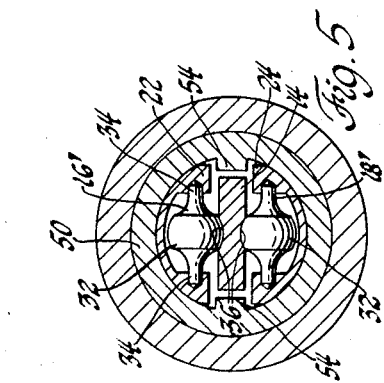
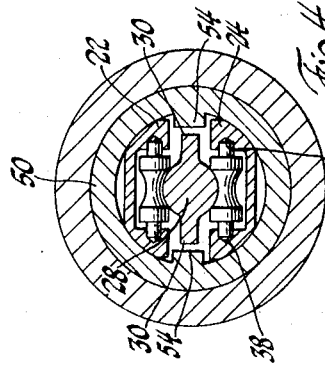
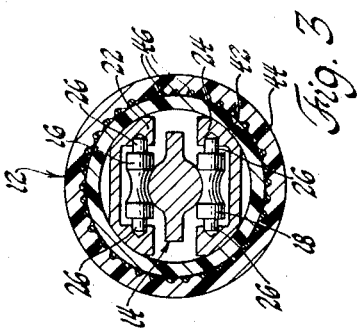
INVENTOR.
Harold E. McCabe
BY
Barnard, McGlynn & Reising
ATTORNEYS

ABSTRACT OF THE DISCLOSURE

A motion transmitting remote control assembly comprising a conduit having a core element disposed therein and being axially movable in the conduit but separated from the walls thereof by a series of longitudinally extending members holding roller elements therein. Each of the roller elements includes a central portion which is only in rolling engagement with the core element and spindles extending laterally in opposite directions from the central portion thereby minimizing friction during the axial movement of the core element.

---

This invention relates to a motion transmitting remote control assembly which is normally operated to control a device by transmitting tension or compression in a curved path by means of a flexible core element. More specifically, this invention relates to a remote control assembly including roller elements disposed in a conduit and in rolling engagement with the core element to facilitate movement of the core element so that the assembly may be installed over a long tortuous path to transmit relatively high loads.

Various remote control assemblies utilizing roller elements have been utilized and are known in the prior art. Such assemblies typically include a conduit with a motion transmitting core element disposed in the conduit with a plurality of roller elements in rolling engagement with both the conduit and the core element. Cage members extending longitudinally through the conduit are frequently utilized to position the roller elements. Upon the actuation of the core element in such an assembly, the roller elements, being in rolling contact with the core element and the inner diameter of the conduit, tend to move along the conduit. Because of this movement, loads are inflicted upon the cage members and frequently such cage members buckle to engage the inner diameter of the conduit or the core element to create frictional loads or forces which resist the movement of the core element. In addition, if the cage members are fixed so that they cannot move longitudinally along the conduit, the movement of the core element is resisted by the roller elements because the rotation of the roller elements is resisted due to their contact with the inner diameter of the conduit.

Accordingly, it is an object and feature of this invention to provide a motion transmitting remote control assembly including a core element with roller elements disposed in the conduit and in rolling engagement only with the core element whereby the problems associated with the prior art assemblies are overcome.

Another object and feature of this invention is to provide a remote control assembly utilizing roller elements in rolling engagement with the core element with retainer means positioning the roller elements longitudinally along the conduit and being free to move longitudinally within the conduit and the conduit including tensioning means for transmitting reactive loads resulting from the movement of the core element.

In general, these and other objects and features of this invention may be attained in a preferred embodiment including a conduit with a motion transmitting core element disposed in the conduit. A first plurality of the roller elements are disposed along and in engagement with one side of the core element and a second plurality of the roller elements are disposed along and in rolling engagement with the other side of the core element. A first member extends longitudinally along the conduit and rotatably supports the first plurality of roller elements and a second member extends longitudinally along the conduit and rotatably supports the second plurality of roller elements. These first and second members are free to move longitudinally within the conduit. Each of the roller elements includes a central portion which is only in rolling engagement with the core element and spindles extending laterally in opposite directions from the central portion. The first and second members engage and rotatably support the spindles of the roller elements, and as viewed in cross section each member extends between the spindles of the roller elements in spaced relation to the central portion of the roller elements whereby the central portions of the roller elements are only in rolling engagement with the core element and are prevented from coming in contact with any other elements, such as the inner diameter of the conduit. A remote control assembly constructed in accordance with the instant invention, therefore, utilizes roller elements which only contact the motion transmitting core element and therefore do not resist movement of the core element, thus providing a much more efficient assembly than those known in the prior art.

Other objects and attendant advantages of the present invention will be readily appreciated as the same becomes better understood by reference to the following detailed description when considered in connection with the accompanying drawings wherein:

FIGURE 1 is a fragmentary cross-sectional view of a preferred embodiment of the instant invention;

FIGURE 2 is a fragmentary cross-sectional view taken substantially along line 2—2 of FIGURE 1;

FIGURE 3 is a cross-sectional view taken substantially along line 3—3 of FIGURE 1;

FIGURE 4 is a cross-sectional view taken substantially along line 4—4 of FIGURE 1; and FIGURE 5 is a cross-sectional view showing an alternative embodiment of the instant invention.

Referring now to the drawings, wherein like numerals indicate like or corresponding parts throughout the several views, a remote control assembly constructed in accordance with the instant invention is generally shown at 10. The remote control assembly 10 includes a conduit, generally indicated at 12, a motion transmitting core element, generally indicated at 14, roller elements 16 and 18, and retainer means, generally indicated at 20, for maintaining the roller elements 16 and 18 only in rolling engagement with the core element 14.

The first plurality of roller elements 16 are disposed on one side of the core element 14 and the second plurality of roller elements 18 are disposed on the opposite side of the core element 14. The retainer means 20 includes a first member 22 which extends lngitudinally along the conduit and rotatably supports the first plurality of roller elements 16, and a second member 24 which extends longtiudinally along the conduit and rotatably supports the second plurality of roller elements 18. The first member 22 rotatably supports each of the roller elements 16 by engaging substantially opposite extremities thereof and extends between the extremities in spaced relationship to the respective roller elements 16. Likewise, the second member 24 rotatably supports each of the second plurality of roller elements 18 by engaging substantially opposite extremities thereof and extends between the extremities in spaced relationship to each of the roller elements 18. More specifically, each of the roller elements 16 and 18 includes a central portion which is only in rolling engagement with the core element 14 and spindles 26 extending laterally in opposite directions from the central portion. The first and second members 22 and 24 engage opposite extremities of the rollers 16 and 18 respectively by rotatably supporting the spindles 26 and extending between the points of contact with the spindles 26 in spaced relation to the central portion of the roller elements 16 and 18. Thus, the retainer means 20 surround a portion of the roller elements 16 and 18 for preventing the roller elements from coming into rolling engagement with anything but the core element 14.

As illustrated in FIGURES 1 through 4, the rollers 16 and 18 have a concave central portion and the core element 14 is convex in the central portion for coacting rolling engagement with the rollers 16 and 18. More specifically, the core element 14 has a cross section including an arcuate portion 28; that is, a portion which is substantially circular in cross section, and laterally extending portions 30 which extend between the first and second members 22 and 24 respectively as best illustrated in FIGURES 3 and 4.

In the alternative embodiment illustrated in FIGURE 5, the roller elements 16' and 18' have substantially spherical central portions 32 with spindles 34 extending laterally therefrom in opposite directions and rotatably supported by the members 22 and 24. The core element 14' has a substantially rectangular cross section with grooves 36 extending therealong on opposite sides thereof. The spherical central portions 32 of the roller elements 16' and 18' are in rolling engagement with the grooves 36. It will be noted that the central spherical portions 32 of the roller elements 16' and 18' are also only in rolling engagement with the core element 14'.

The first and second members 22 and 24 respectively include a pair of grooves 38 which extend therealong. The spindles 26, or the spindles 34 when the rollers as illustrated in FIGURE 5 are utilized, are rotatably disposed in the grooves 38 of the respective members 22 and 24. The rollers 16 and 18 are spaced from one another longitudinally along the respective members 22 and 24 and there is included means comprising the crimping 40 for maintaining the spacing of the rollers 16 and 18. That is, the material of the members 22 and 24 is deformed on either side of the spindles 26 and in the grooves 38 to prevent the respective rollers from moving longitudinally along the members 22 and 24. Of course, other appropriate means such as spacers in the grooves may be utilized to maintain the spacing of the roller elements.

The conduit 12 includes an inner tubular member 42, an outer casing 44, and a plurality of filaments 46. The filaments 46 provide tension means for transmitting reactive loads resulting from movement of the core element 14. The filaments 46 are wrapped helically on a long lead about the inner tubular member 42 and the casing 44 surrounds the inner tubular member 42 and the filaments 46.

A fitting, generally indicated at 48, comprises two elements threaded together at 50 and is attached to the end of the conduit 12. A guide means, generally indicated at 52, is rotatably disposed in the fitting 48 for maintaining the first and second members 22 and 24 spaced circumferentially from one another and, in addition, allows the first and second members 22 and 24 to move longitudinally relative to the conduit and relative to one another.

More specifically, and as illustrated in FIGURES 4 and 5, the guide means 52 comprises a sleeve having ears or projections 54 which extend between the respective members 22 and 24 for maintaining the members 22 diametrically opposed and circumferentially spaced from one another. Thus, the members 22 and 24 are circumferentially spaced from one another but are allowed to move longitudinally relative to the conduit and relative to one another.

The core element 14 is attached to a terminal member 56 by the pins 58. The terminal member 56 extends from and is slidably disposed in the fitting 48 and is adapted to be attached to a control element.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly of the type for transmitting motion in a curved path by a flexible motion transmitting core element and comprising: a conduit, a motion transmitting core element disposed in said conduit, a first and second plurality of roller elements disposed within said conduit, and flexible retainer means within said conduit rotatably supporting said roller elements in rolling engagement with said core element and preventing engagement of said roller elements with any other components of said assembly, said retainer means including a first member extending longitudinally along said conduit and rotatably supporting said first plurality of roller elements and a second member extending longitudinally along said conduit and rotatably supporting said second plurality of roller elements.

2. A motion transmitting remote control assembly as set forth in claim 1 wherein said members are free to move longitudinally within said conduit.

3. A motion transmitting remote control assembly as set forth in claim 2 including tension means for transmitting reactive loads caused by movement of said core element.

4. A motion transmitting remote control assembly as set forth in claim 1 wherein said first and second members surround a portion of said first and second plurality of roller elements respectively for preventing said roller elements from coming into rolling engagement with anything but said core element.

5. A motion transmitting remote control assembly as set forth in claim 1 wherein each of said roller elements includes a central portion in rolling engagement with said core element and spindles extending laterally in opposite directions therefrom, said members rotatably supporting said spindles for maintaining said central portions in spaced relation thereto so that said central portions are only in rolling engagement with said core element.

6. A motion transmitting remote control assembly as set forth in claim 5 wherein said central portions of said roller elements are concave.

7. A motion transmitting remote control assembly as set forth in claim 6 wherein said core element has a cross section including an arcuate portion which extends therealong and is in rolling engagement with the concave central portions of said roller elements.

8. A motion transmitting remote control assembly as set forth in claim 5 wherein said central portions of said roller elements are spherical.

9. A motion transmitting remote control assembly as set forth in claim 8 wherein said core element includes at least one groove extending therealong and said spherical central portions of said roller elements being in rolling engagement therewith.

10. A motion transmitting remote control assembly as set forth in claim 1 wherein said first plurality of said roller elements are disposed on one side of said core element and said second plurality of said roller elements are disposed on the opposite side of said core element.

11. A motion transmitting remote control assembly as set forth in claim 10 including a fitting attached to one end of said conduit, and guide means disposed in said fitting for maintaining said first and second members circumferentially spaced from one another and for allowing said first and second members to move longitudinally relative to said conduit and relative to one another.

12. A motion transmitting remote control assembly as set forth in claim 11 including tension means for transmitting reactive loads resulting from the movement of said core element.

13. A motion transmitting remote control assembly as set forth in claim 12 wherein said conduit includes an inner tubular member and a casing, and said tension means includes at least one filament helically wrapped on a long lead about said inner tubular member, said casing surrounding said inner tubular member and said filament.

14. A motion transmitting remote control assembly as set forth in claim 10 wherein said first member rotatably supports each of said first plurality of roller elements by engaging substantially opposite extremities thereof and extends between said extremities in spaced relationship to said first plurality of roller elements, and said second member rotatably supports each of said second plurality of roller elements by engaging substantially opposite extremities thereof and extends between said extremities in spaced relationship to said second plurality of roller elements.

15. A motion transmitting remote control assembly as set forth in claim 14 wherein each of said roller elements includes a central portion which is only in rolling engagement with said core element and spindles extending laterally in opposite directions therefrom, said first and second members engaging said opposite extremities of said rollers by rotatably supporting said spindles of said first and second plurality of rollers respectively.

16. A motion transmitting remote control assembly as set forth in claim 15 wherein one of said central portion and said core element is concave and the other of said central portion and said core element is convex for coacting rolling engagement therebetween.

17. A motion transmitting remote control assembly as set forth in claim 16 wherein said first member is circumferentially spaced from said second member and said core element includes laterally extending portions as viewed in cross section which extend between said first and second members.

18. A motion transmitting remote control assembly as set forth in claim 17 wherein each of said first and second members includes a pair of grooves extending therealong, said spindles of said first plurality of rollers being rotatably disposed in said grooves of said first member and said spindles of said second plurality of rollers being rotatably disposed in said grooves of said second member.

19. A motion transmitting remote control assembly as set forth in claim 18 wherein said first plurality of rollers are spaced along said first member and means for maintaining the spacing of said first plurality of rollers, and wherein said second plurality of rollers are spaced along said second member and means for maintaining the spacing of said second plurality of rollers.

20. A motion transmitting remote control assembly as set forth in claim 19 including tension means for transmitting reactive loads resulting from the movement of said core element.

21. A motion transmitting remote control assembly as set forth in claim 20 including a fitting attached to one end of said conduit, and guide means rotatably disposed in said fitting for maintaining said first and second members spaced circumferentially from one another and for allowing said first and second members to move longitudinally relative to said conduit and relative to one another.

22. A motion transmitting remote control assembly as set forth in claim 21 wherein said conduit includes an inner tubular member and a casing, and said tension means includes a plurality of filaments wrapped helically on a long lead about said inner tubular member, said casing surrounding said tubular member and said filaments.

References Cited
UNITED STATES PATENTS

| | | | |
|---|---|---|---|
| 2,787,917 | 4/1957 | Schroeder | 74—502 |
| 2,907,610 | 10/1959 | Wise. | |
| 3,154,966 | 11/1964 | Bratz | 74—501 |
| 3,258,990 | 7/1966 | Bratz | 74—501 |
| 3,287,990 | 11/1966 | Ellinger | 64—2 X |

FOREIGN PATENTS

| | | |
|---|---|---|
| 283,855 | 10/1952 | Switzerland. |
| 1,000,550 | 8/1965 | Great Britain. |

FRED C. MATTERN, Jr., Primary Examiner

C. F. GREEN, Assistant Examiner

U.S. Cl. X.R.

64—2; 308—6, 217